W. R. Jackson
Floating Cabins for Vessels.
N° 13,006.    Patented June 5, 1855.

Sheet 1. 2 Sheets.

Sheet 2. 2 Sheets.

W. R. Jackson.
Floating Cabins for Vessels.
Nº 13,006. Patented June 5, 1855.

UNITED STATES PATENT OFFICE.

WILLIAM R. JACKSON, OF BALTIMORE, MARYLAND.

IMPROVEMENT IN FLOATING CABINS FOR STEAM AND OTHER VESSELS.

Specification forming part of Letters Patent No. 13,006, dated June 5, 1855.

*To all whom it may concern:*

Be it known that I, WILLIAM R. JACKSON, of the city of Baltimore, in the State of Maryland, have invented certain new and useful Improvements in the Construction of Deck or Saloon Cabins for Steam or other Vessels; and I do hereby declare that the following is a full, clear, and exact description of the same, reference being had to the accompanying drawings, making a part of this specification.

Figure 1:
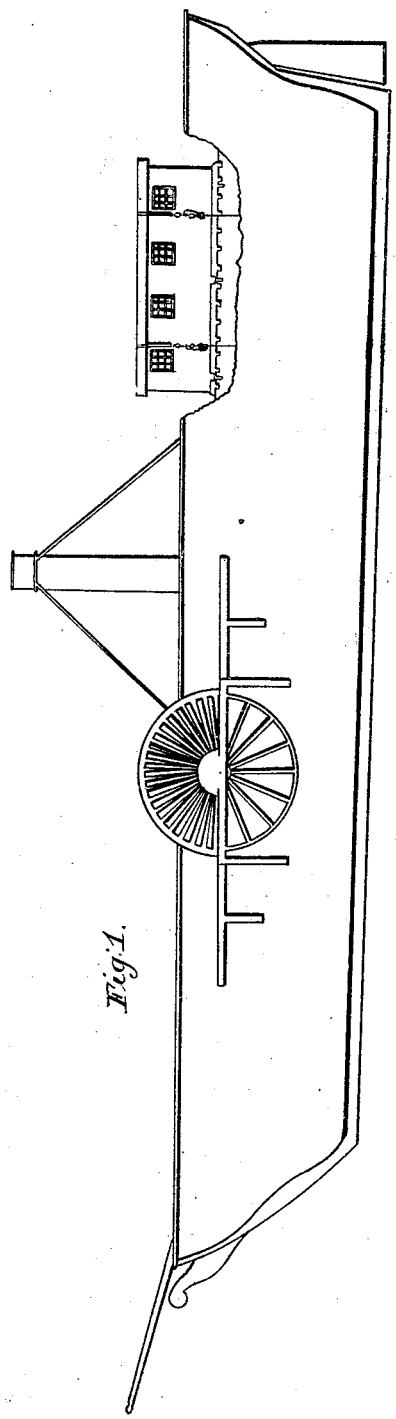
Figure 2:
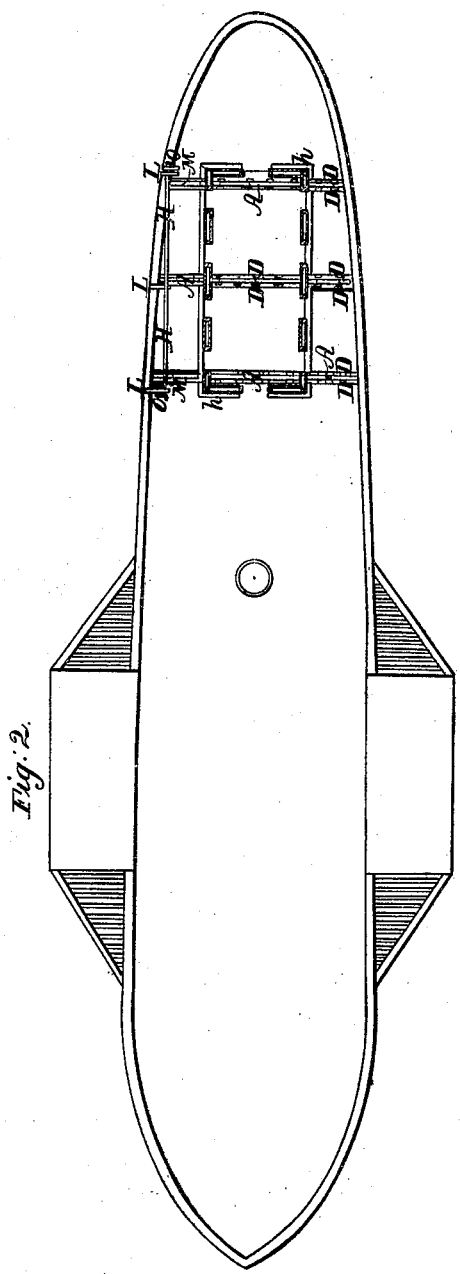
Figure 3:
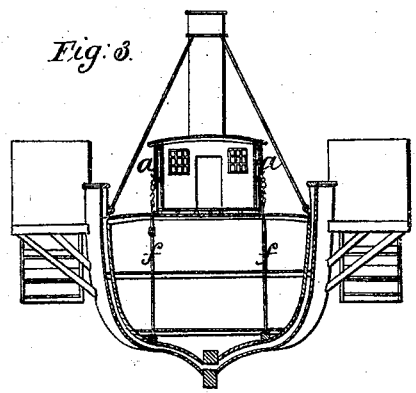
Figure 4:
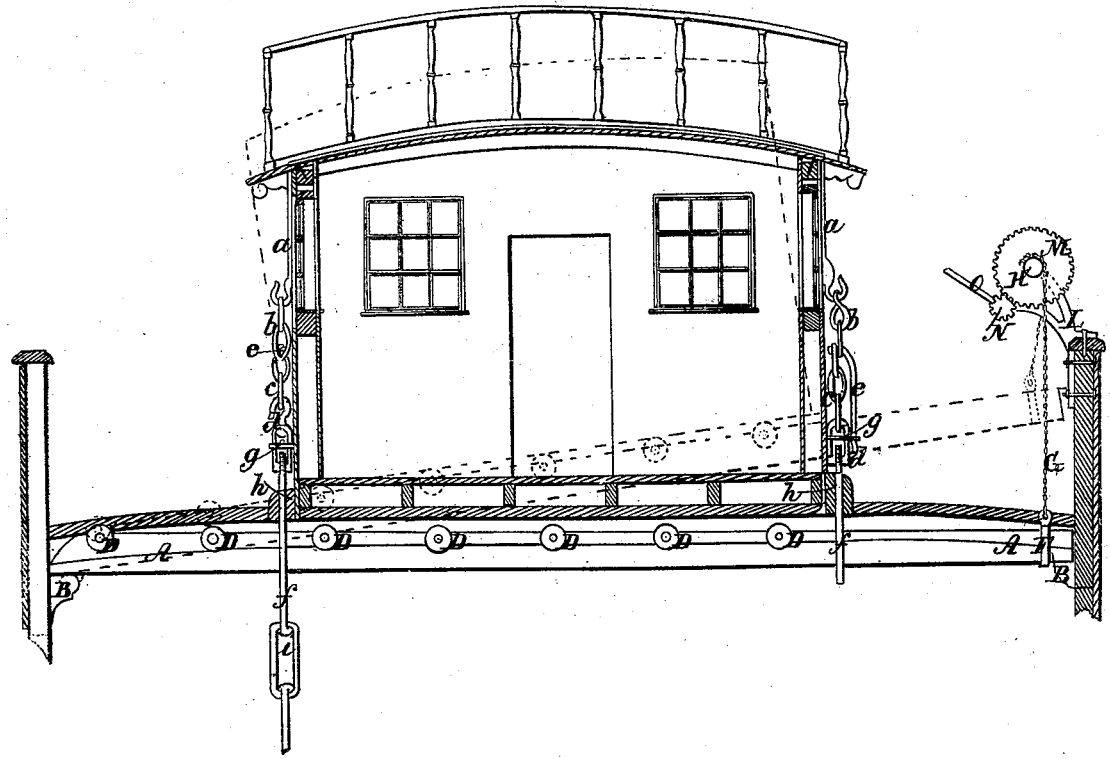

Figure 1 is a side elevation, and Fig. 2 a plan, of the vessel and cabin; Fig. 3, a cross-section of the hull and cabin, and Fig. 4 a cross-section exhibiting in detail the mode of securing the cabin to the hull and the manner in which it may be removed therefrom.

The nature of my invention consists in the construction of deck or saloon cabins of steam or other vessels in such a substantial manner by securing and uniting the several parts thereof—viz., the floor, the sides, and roof—to each other as to render it capable of resisting the violence of the shock of launching, when necessary, and the force of the wind and waves when launched, and thus subserve the purpose of a safety and escape vessel or life-boat in the event of accident from foundering or fire occurring, while at the same time its value and usefulness as an ordinary cabin of the vessel are not in the least degree affected.

To enable others skilled in the art to construct and use my improvement, I will describe it as follows:

The cabin or saloon may be of any desired form or dimension, keeping in view, however, its capacity of accommodating the crew and passengers in case of emergency. The floor of the cabin is formed entirely distinct from the ordinary deck of the hull and is composed of strong timbers extending from side to side and strengthened properly with cross-framing. This cabin-floor is not only planked on its upper but on the lower side of the timbers, so as to increase its strength, and buoyancy is obtained. The sides or walls of the cabin are likewise formed of strong timbers raised upon and united with the timbers and framing of the floor, being secured thereto by suitable angle-irons or other device, so as to render the separation of the sides exceedingly difficult. The roof is likewise formed of timbers similarly united to the sides, and the planking of the roof and sides is applied to the inside as well as outside. Any desired windows or doors may be introduced, as in ordinary cabins. I thus create a substantially-constructed cabin or saloon entirely distinct from the hull of the vessel, and which may be secured thereto by any suitable device, such as metal rods $ff$, passing through the deck-timbers, admitting of being driven below the level of said timbers. Said rods are provided with swivel-hooks $dd$ for tightening the straps $aa$ by chains $b$, &c., when made continuous by the trigger $e$ and slip-ring $g$.

That portion of the deck of the hull whereon the cabin is placed is not planked over, (although the ordinary ceiling should be applied,) being left open to allow the launching-beams A A, extending from side to side of the vessel, to be inserted, and as these beams A A admit of one end being raised the spaces between them and the timbers of the hull are made tight by calking, so as to render the deck outside of the cabin water-proof, or, if necessary, the calking can be applied to the space under the cabin also. When it is necessary to launch the cabin, those beams A A may be raised at one end and an inclined plane formed by means of chains G, shaft H, or other suitable contrivance, and from the beams A A being provided with friction-rolls D D the sliding of the cabin, although large, is secured. These beams are shown in dotted line, Fig. 4, in position as elevated at one end for launching. Instead of launching over the side a rack may be extended fore and aft of the cabin on the under side thereof, which may be operated on by a pinion, and thus the cabin launched over the stern of the vessel. It is proper to remark that this launching would not be necessary in the sinking of the hull. All that would then be requisite would be the removal of the triggers from their slip-rings and the cabin would safely float when the hull sank below it. Having this provision for launching in the event of fire occurring in the hull of the vessel or of disposing of the cabin should it be on fire by running it overboard, and thus extinguish it and preserve the hull, is certainly a valuable consideration in the preservation of human life.

What I claim as my invention, and desire to secure by Letters Patent, is—

The construction of a deck or saloon cabin of a steam or other vessel, substantially in the manner described, so that it shall admit of being separated from the hull and form in itself an escape or life boat, as set forth.

W. R. JACKSON.

Witnesses:
 JOHN F. CLARK,
 W. S. CLARK.